3,368,993
ACRYLONITRILE POLYMER SOLUTION
Akira Nakajima, Saidaiji, Japan, and Makoto Shinohara, Syracuse, N.Y., assignors to American Cyanamid Company, Stamford, Conn., a corporation of Maine
No Drawing. Filed Mar. 29, 1965, Ser. No. 443,672
Claims priority, application Japan, Apr. 21, 1964, 39/22,531
8 Claims. (Cl. 260—29.6)

The present invention relates to a uniform and spinnable polymer solution of an acrylonitrile polymer containing a styrene polymerized therewith dissolved in an aqueous ketone solution of a thiocyanate salt.

Aqueous solutions of thiocyanate salts have many advantages as described in the specification of U.S. Patent No. 2,605,246 and are suitable for producing easily formable polymer solutions from copolymers of acrylonitrile. However, when the polymers contain polymerizable monomers which are non-polarizable or weakly polarizable and have one or more ethylenically unsaturated bonds, such as styrene and its derivatives, a uniform copolymer solution in aqueous thiocyanate solvent cannot be produced from an acrylonitrile polymer containing more than 85% of acrylonitrile.

We have discovered that, by using a mixed solvent composed of thiocyanate salt, organic solvent, and water, it is possible to produce a uniform, spinnable polymer solution from such a copolymer of acrylonitrile containing a monomer which is non-polarizable or weakly polarizable.

The above-mentioned "organic solvent" refers to an organic compound soluble in water whose resultant aqueous solution is capable of fully dissolving the thiocyanate salt and the polymerizable monomer compound which is non-polarizable or weakly polarizable. Examples of such organic solvent are lower aliphatic ketones, e.g., acetone, methyl ethyl ketone, diethyl ketone, methyl propyl ketone, ethyl propyl ketone, etc., and cyclic ketones, e.g., cyclobutanone, cyclopentanone, cyclohexanone, etc. The simultaneous use of mixtures of ketones also results in the achievement of the objects of the present invention.

The relative proportions of the above-mentioned organic solvent and water used in the practice of this invention varies according to the composition of the acrylonitrile polymers and organic solvents used. These organic solvents generally act as precipitators with respect to acrylonitrile polymers, so that there exists a certain critical ratio above which the acrylonitrile polymer would become separated from the polymer solution. The ratio between the organic solvent and water in a mixed medium according to this invention includes all the ratios at which the acrylonitrile polymer forms a homogeneous solution. The optimum ratio between the organic solvent and water is a function of the composition of the acrylonitrile polymer and the organic solvent employed.

For example, in producing a dope from an acrylonitrile polymer containing 10% styrene by using a mixed medium of a thiocyanate salt solution of acetone and water, an aqueous mixed medium containing 5–40%, preferably 18–38% of acetone is suitable as the mixed medium, when the concentration of thiocyanate salt is 44%. In producing a dope from an acrylonitrile polymer containing 10% of styrene and 5% of methyl acrylate by using a mixed medium containing 46% of thiocyanate salt, an aqueous mixed medium containing 20–40% of acetone is preferable. In producing a dope from an acrylonitrile copolymer containing 10% of styrene, when using a mixed aqueous medium of methyl ethyl ketone containing 50% of thiocyanate salt it is preferable that such mixed medium contains 2–19%, particularly 10–17%, of methyl ethyl ketone. Further, when cyclohexanone is to be used, it is preferable that it contains 1–5%, particularly 2–4%, of cyclohexanone. These examples are given for better illustrating that the optimum ratio between the organic solvents and water varies according to the organic solvents and the composition of the copolymer employed, and not for the purpose of limiting the scope of the invention.

When the concentration of thiocyanate salt in such a mixed medium is less than 40%, the ability to dissolve acrylonitrile polymers is decreased, and when it is less than 35%, acrylonitrile polymers cannot be dissolved. When the concentration of thiocyanate salt is greater than 60%, the dope viscosity is greatly increased, causing easier separation of thiocyanate salt crystals at room temperature and hence difficulties in operation. It is therefore preferable that the thiocyanate concentration used in the invention be within a range of 35–60%, the optimum concentrations being determined within said range depending on the molecular weight and composition of acrylonitrile polymer and the kinds and the amounts of organic solvents used.

The following examples are for the purpose of better explanation of the invention, and are not intended to so limit the invention.

*Example 1*

10 parts of an acrylonitrile polymer containing 10% styrene (having an intrinsic viscosity [$\eta$] of 1.48 at 30° C. in a dimethylformamide solution) were added to 90 parts of mixed medium composed of 50 parts of thiocyanate salt, 25 parts of acetone, and 25 parts of water, and were stirred at 40° C. for 1 hour to obtain a uniform solution. The solution, when cooled, was left at 10–20 mm. of mercury to be degassed. Then the solution was extruded through a spinnerette having 50 holes, 0.05 mm., diameter into an aqueous solution of 10% thiocyanate salt at 0° C. and allowed to coagulate therein, followed by stretching in boiling water to obtain a yarn having a good resiliency.

*Example 2*

12 parts of an acrylonitrile polymer containing 10% styrene [having an intrinsic viscosity [$\eta$] of 1.32 at 30° C. in a dimethylformamide solution] were added to 88 parts of mixed medium composed of 49 parts of thiocyanate salt, 34 parts of acetone, and 17 parts of water, and stirred and dissolved at 40° C. for 1 hour to obtain a uniform polymer solution. This solution was spun into yarn by the low temperature spinning method of Example 1. The yarn was easy to stretch, capable of stretching at low temperatures and was highly resilient.

*Example 3*

10 parts of an acrylonitrile polymer containing 10% styrene [having an intrinsic viscosity [$\eta$] of 1.48 at 30° C in a dimethylformamide solution] were added to 90 parts of mixed solvent composed of 50 parts of thiocyanate salt, 4 parts of cyclohexanone, and 46 parts of water, and were stirred at 40° C. for 1 hour to obtain a uniform, spinnable polymer solution.

*Example 4*

10 parts of an acrylonitrile polymer containing 5% styrene and 10% methyl acrylate [having an intrinsic viscosity [$\eta$] of 1.41 at 30° C. in a dimethylformamide solution] where added to 90 parts of mixed medium composed of 46 parts of thiocyanate salt, 27 parts of acetone, and 27 parts of water, and were stirred and dissolved at 40° C. for 1 hour to obtain a uniform, spinnable polymer solution.

*Example 5*

12 parts of an acrylonitrile polymer containing 8% styrene and 0.5% p-styrene sodium sulfonate [having an intrinsic viscosity $[\eta]$ of 1.35 at 30° C. in a dimethylformamide solution] were added to a mixed medium of 48% of thiocyanate salt, 26% of acetone, and 26% of water, and were stirred at 40° C. for 1 hour to obtain a uniform, spinnable copolymer solution. By using the spinning method shown in Example 1, a dyeable yarn excellent in elastic recovery was obtained.

We claim:

1. A composition of matter comprising a homogeneous solution of an acrylonitrile copolymer containing a styrene comonomer polymerized therewith dissolved in a solvent mixture of a thiocyanate salt, water and a ketone, the water to ketone ratio being one at which the acrylonitrile copolymer forms a homogeneous solution and the relative proportions of acrylonitrile and styrene is said copolymer being such that said copolymer is incapable of forming a homogeneous solution in either said ketone alone or an aqueous solution of said thiocyanate salt alone.

2. A composition of matter comprising a homogeneous solution of an acrylonitrile copolymer containing a styrene comonomer polymerized therewith dissolved in a solvent mixture of 35% to 60% of a thiocyanate salt, water, and a ketone, the water to ketone ratio being one at which the acrylonitrile copolymer forms a homogeneous solution and the relative proportions of acrylonitrile and styrene in said copolymer being such that said copolymer is incapable of forming a homogeneous solution in either said ketone alone or an aqueous solution of said thiocyanate salt alone.

3. A composition as defined in claim 2 wherein said ketone is selected from the group consisting of lower aliphatic ketones, cyclic ketones, and mixtures thereof.

4. A process for preparing fibers of an acrylonitrile copolymer containing a styrene comonomer polymerized therewith comprising dissolving such copolymer in a solvent mixture of a thiocyanate salt, water, and a ketone to form a homogeneous solution and spinning such solution into a coagulating medium, the water to ketone ratio being one at which the acrylonitrile copolymer forms a homogeneous solution and the relative proportions of acrylonitrile and styrene in said copolymer being such that said copolymer is incapable of forming a homogeneous solution in either said ketone alone or an aqueous solution of said thiocyanate salt alone.

5. A process as defined in claim 4 wherein said ketone is selected from the group consisting of lower aliphatic ketones, cyclic ketones, and mixtures thereof.

6. A composition of matter comprising a homogeneous solution of an acrylonitrile copolymer of at least 85% acrylonitrile containing up to 15% of a styrene comonomer polymerized therewith dissolved in a solvent mixture of of a thiocyanate salt, water and a ketone, the water to ketone ratio being one at which the acrylonitrile copolymer forms a homogeneous solution and the relative proportions of acrylonitrile and styrene in said copolymer being such that said copolymer is incapable of forming a homogeneous solution in either said ketone alone or an aqueous solution of said thiocyanate salt alone.

7. A composition of matter as defined in claim 6 wherein said solvent mixture contains 35% to 60% of said thiocyanate salt.

8. A process as defined in claim 4 wherein said copolymer contains at least 85% acrylonitrile and up to 15% of a styrene comonomer polymerized therewith.

References Cited

UNITED STATES PATENTS

| | | | |
|---|---|---|---|
| 2,413,758 | 1/1947 | Fremon | 260—32 |
| 2,605,246 | 7/1952 | Cresswell et al. | 260—29.6 |
| 2,716,093 | 8/1955 | McClellan | 260—29.6 |
| 2,404,713 | 7/1946 | Houtz | 262—32 |

FOREIGN PATENTS

| | | |
|---|---|---|
| 708,120 | 4/1954 | Great Britain. |
| 608,900 | 11/1960 | Canada. |

MURRAY TILLMAN, *Primary Examiner.*

GEORGE G. LESMES, *Examiner.*

J. L. WHITE, *Assistant Examiner.*